May 6, 1969         H. D. HAZZARD         3,443,164
ROLLED ALUMINUM SLUG CAPACITOR
Filed March 13, 1967
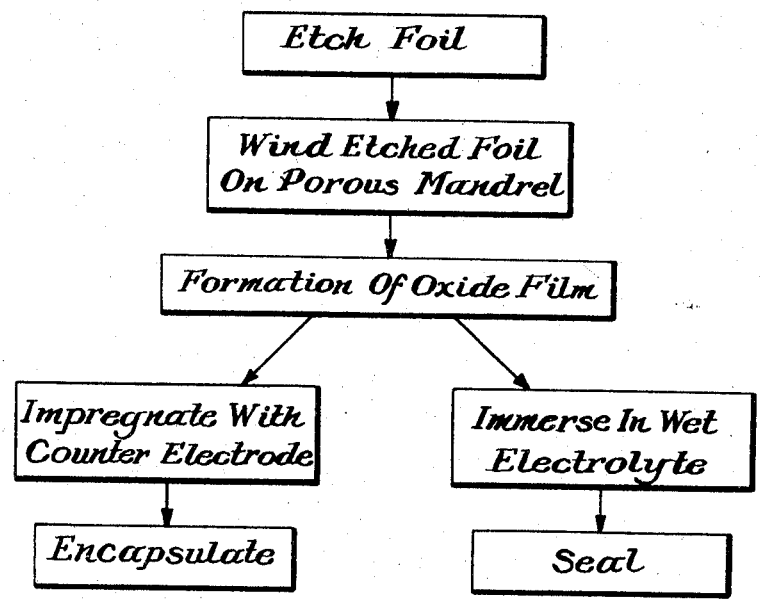
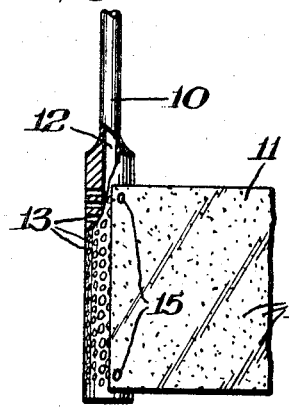
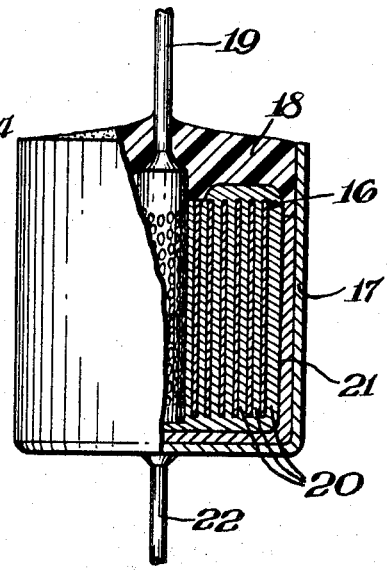
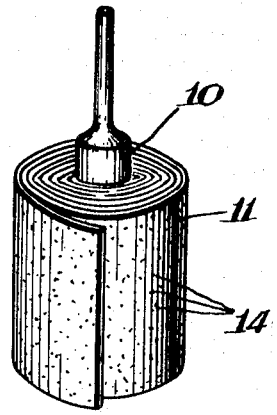

United States Patent Office 3,443,164
Patented May 6, 1969

3,443,164
ROLLED ALUMINUM SLUG CAPACITOR
Henry D. Hazzard, Williamstown, Mass., assignor to Sprague Electric Company, North Adams, Mass., a corporation of Massachusetts
Filed Mar. 13, 1967, Ser. No. 622,724
Int. Cl. H01g 9/02
U.S. Cl. 317—230                      10 Claims

ABSTRACT OF THE DISCLOSURE

An aluminum foil capacitor has a highly etched porous foil permeable to liquid which is rolled in unformed state on a porous mandrel through which the porous rolled foil can be impregnated. Impregnation of the rolled foil includes the introduction of a forming electrolyte, film-forming the foil and subsequently providing an intimate electrical contact of a conductive material with the dielectric film. The contacting conductive material is either a wet electrolyte or a flowable electrically conductive material introduced into the porous rolled foil.

Background of the invention

This invention relates to a convolutely wound porous highly etched aluminum foil capacitor and more particularly to a rolled aluminum electrolytic capacitor having a thin porous aluminum foil electrode with a maximum increase of surface and to the process of making the same by impregnation of a rolled foil section.

The following known art is considered worthy of specific mention but no representation is intended that this is the best art.

Capacitors having a dielectric film on a film-forming anode, such as electrolytic capacitors having aluminum foil electrodes, preferably have a maximum amount of surface area on which a dielectric oxide film can be formed. At the same time, it is desirable to provide as high a ratio of surface area to electrode volume as possible. It is also important to form and maintain a continuous unbroken dielectric film over the entire exposed anode surface. The handling of the anode preferably should avoid damage to the dielectric film and low initial electrical leakage properties. Generally, the capacitors are comprised of oxide coated aluminum foils in a compact roll. Terminals or straps are secured to the respective foils and extend from the roll. Prior to the formation of the dielectric oxide on the foil and the rolling of the foil, it is etched to increase its surface area. Preferably this etching provides a maximum increase in surface.

In one form of anode foil for capacitors a high increase of foil surface area is achieved by etching the aluminum foils to a point where the foils are permeable to liquid but not to light. This is accomplished by etching the foil and terminating the etching when the foil is permeable to liquid but not to light. Such fragile foil, however, presents a handling problem subsequently when it is rolled or when the tabs are attached. Among other shortcomings the dielectric film is delicate on this thin highly porous foil.

A different type of capacitor that has a dielectric film on a film-forming anode embodies an anode of aluminum powder pressed and sintered into a porous compact mass or pellet to provide a large surface area on which a thin anodic dielectric oxide film is formed by an anodizing process. The anodized pellet is then impregnated with a suitable electrolyte.

The sintering of aluminum powder to form a sintered pellet requires heating to sintering temperatures and this has an undesirable effect upon the aluminum. Moreover, there are problems in the preparation and handling of the pellet. Even after the pellet is sintered the necessary film-forming and contact producing procedures involve difficulties in adequacy of impregnation and subsequent evacuation, for example. Also it is desirable to achieve a low equivalent series resistance by reduction of the mass of the parts of the component. The finished body of an aluminum sintered anode presents a high mass as compared to the capacitance value obtained. It is desirable to obtain more capacitance per volume than is provided by a capacitor having a sintered aluminum slug.

A capacitor has been made of two foil electrodes formed with a dielectric film and having a solid electrolyte of manganese dioxide provided in the section between the foils. The production of this manganese dioxide requires the impregnation of a precursor and an undesirable pyrolytic conversion which is deleterious to the oxide film and the anode metal.

Thus it is seen that it is desirable to achieve both low D.C. leakage and low ESR.

Summary of the invention

This invention provides an etched foil capacitor having a permeable anode body of rolled etched foil on which the dielectric film is formed in situ by impregnation of a forming electrolyte into the permeable anode body. The anode body of film-formed highly permeable foil is filled by internal impregnation with an electrically conductive material in intimate contact with the film. More particularly, this invention provides an aluminum foil having mere mechanical coherence but being so over-etched as to be fragile and in a tightly rolled structure permeable to a flowable material containing electrically conducting material.

More specifically, the over-etched foil is wound on a porous mandrel and formed with a dielectric oxide by impregnation of a forming electrolyte into the foil through the porous mandrel. Particularly, an over-etched fragile aluminum foil is embodied in a capacitor with gentle handling and a dielectric film is formed under conditions that result in low leakage current. The dielectric film is formed after the fragile foil has been rolled into its final shape. The electrically conductive material is incorporated in the body of formed foil with an absolute minimum of physical dislocation.

The small capacitor body permits vacuum impregnation.

It is an object of this invention to provide a low equivalent series resistance filmed anode capacitor having an easily impregnable anode body.

It is an object of this invention to provide a permeable highly etched aluminum foil in a convolutely wound capacitor section which is readily and easily impregnated.

It is another object of this invention to provide a convolutely wound aluminum foil capacitor section with a maximum ratio of capacitance to volume.

It is still another object of this invention to process an impregnated anode body without heat.

It is a further object of this invention to provide a method of forming a dielectric film on an over-etched foil in a capacitor body resulting in a minimum leakage current in the finished body.

It is a further object to provide in a capacitor anode having myriad interstices and an electrolyte in the body without heat.

A still further object of this invention is a convolutely wound aluminum foil capacitor with no tabs or straps attached to the foils.

Brief description of the drawings

The above and other objects of this invention will become more apparent upon consideration of the following description taken together with the accompanying drawings in which:

FIGURE 1 is a block chart identifying steps of the method of producing an electrolytic capacitor according to this invention;

FIGURE 2 is a front elevation of the over-etched foil attached to the porous mandrel before winding according to this invention;

FIGURE 3 is a perspective view of the section of foil wound on the mandrel; and

FIGURE 4 is a front elevation partly in section of a completed capacitor enclosed in a container.

*Detailed description*

In its preferred embodiment, the capacitor of this invention has a rolled section containing a mechanically coherent, over-etched foil which, in one embodiment, may have gross physical holes and is of sufficient porosity to allow a liquid permeating the foil to easily wet the other side. This over-etched foil is rolled snugly into a convolutely wound section but has myriad tortuous passages so as to allow the permeation of the section. For example, the section may be wound upon a porous mandrel and impregnated from the central bore of the mandrel. A dielectric oxide film is formed by anodization on the surfaces of the rolled etched aluminum foil. The foil is anodized in place. The wound foil is then suitably rinsed to clear the film-formed surface.

After the dielectric oxide film has been formed, the convolutely wound film-formed anode foil is placed in a container and the section is impregnated, as for example, through the mandrel to provide an electric contact with the dielectric film. The electric contact may be provided by impregnating the section with a flowable material which can provide an intimate electrical contact with the dielectric film. The container is then suitably sealed.

The permeable foil has mechanical coherence but is sufficiently porous so that a flowable liquid containing electrically conducting material can be universally dispersed through the rolled body. The porous anode body resulting from the convolute winding of the foil on the porous mandrel is perforated with myriad tortuous passages. These myriad passages serve both to provide passage for the fluids introduced into the foil through the mandrel and also to provide extensive surface area on which the dielectric film is formed. The resultant anode structure has a high capacitance to volume ratio and is structurally rugged. Moreover the gentle handling procedure with its minimum of dislocation preserves the fragile foil and the delicate dielectric film.

Referring to the flow sheet of FIGURE 1, the first step in the preparation of the capacitor of this invention is the manufacture of permeable foil by etching. The anode foil for this electrolytic capacitor has material removed to form indentations into and thereby increase the effective surface area so that a higher electrical capacity can be obtained from the electrodes of the same marginal dimensions. The etching is carried to a point where the foil is over-etched and will easily pass water, it may have gross physical holes. For example, a very effective etch for aluminum foils is anodically treating aluminum foil of high purity at least 99.97% aluminum in an aqueous solution containing alkali metal halide with a current density and at a temperature which will within a given time, treat the surface so that it becomes rough and pitted and over-etched. Such etching produces many passages and may be carried to the point of creating gross physical holes. A flow of liquid is possible through the foil so that the foil is permeable. The foil in this condition is satisfactory for the production of the high capacitance resulting from the much larger effective area per unit of nominal area.

The over-etched foil has thin spots and is fragile. A mandrel is provided for supporting this over-etched, fragile foil. The mandrel has a passage or passages and in part surface apertures so as to be readily permeable to the passage of liquid in a uniform flow axially of the mandrel and in a selected area out of the mandrel. The mandrel may be a porous aluminum mandrel or a porous ceramic mandrel and it may have a central bore or a number of passages. The foil is attached to the mandrel and convolutely wound on the porous mandrel. The mandrel with the over-etched foil convolutely wound and supported on it provides for introducing a liquid into the convolutely wound section through the mandrel apertures and the passages of the over-etched foil.

In the next step, the etched aluminum foil is suitably formed with an oxide film as in a boric acid solution and under a film formation voltage. The film formation voltage is selected on the basis of the desired voltage characteristic of the resultant capacitor. The formation electrolyte is permeated into the porous anode body by impregnation from the base of the hollow mandrel through the foraminous passages while immersed in a bath of the electrolyzing solution. The dielectric film is formed thereafter by standard procedures.

In the next stage the porous anode body with its continuous covering of dielectric film are provided with a conductive material in intimate contact with the dielectric film. This conductive material is provided within the porous body by impregnation of a flowable substance through the mandrel conduit and the walls of the mandrel and the permeability of the convolutions of the wound porous body. This stage of the capacitor producing process may be embodied in one of two generally distinct procedures. In one embodiment the porous anode body is provided with essentially a solid material in intimate contact with the dielectric film and in the other embodiment the porous anode is provided with essentially a liquid in intimate contact with the dielectric film.

The first mentioned embodiment is illustrated in the left column in the lower part of FIGURE 1 and the second mentioned embodiment is illustrated in the right column in the lower part of FIGURE 1.

In the first embodiment a flowable mixture is passed into the porous body by means of impregnation into the convolutely wound porous foil of a solid conductive material in a fluid condition such as aquadag or lead oxide in a slurry. The vehicle which carries this flowable solid electrode material is sufficiently volatile to be easily removable without harm to the oxide film. The impregnation may be assisted by lowering the pressure ambient on the body so as to bring about a vacuum impregnation. Before impregnation the formed anode body is positioned in a suitable container and after impregnation the vehicle is removed to leave a solid deposit. If the first impregnation or volatilization step does not provide sufficient build-up of electrode material, the process can be repeated to result in the continuous counterelectrode.

By using conducting (semiconductor) organic materials an electrical contact can be brought into intimate contact with the dielectric film. For example, the electrically conductive TCNQ salts described in U.S. Patent No. 3,214,-650 are applicable. Also the polymers described in U.S. Patent No. 2,786,088 may be useful in providing a quasi-solid electrolyte for the electrically conductive material in contact with the dielectric film. These conductive materials are incorporated and deposited without the use of deleterious heat.

The porous anode body may also incorporate electrode material as indicated in the right column of FIGURE 1. The wet electrode is provided by introducing one of the accepted electrolytes for aluminum electrolytic capacitors into the porous anode body through the mandrel and impregnating it into the rolled etched aluminum foil. The electrolyte may consist of a viscous mixture such as polyhydric alcohols, water and either boric acid or various salts, such as ammonium pentaborate. The rolled unit is inserted in a can and the wet electrolyte system is impregnated into the unit. The embodiment is then completed by suitably sealing the open end of the can.

Referring to the illustrated embodiment, FIGURE 2 shows a hollow porous mandrel 10 on which is attached a previously over-etched foil 11. The mandrel 10 contains a central bore 12 from which passages 13 extend outward. The over-etched foil 11, in turn has an anodized surface which is completely etched through at some places to provide passages and even gross physical holes 14. The foil 11 is suitably attached to the mandrel 10 as at points 15, so that it can be convolutely wound around the central mandrel.

FIGURE 3 shows the foil 11 and the mandrel 10 with the foil convolutely wound around the mandrel to form a porous anode body. This porous anode body is capable of having a thin, continuous, dielectric film formed on the highly increased effective surface area of the over-etched foil. A suitable formation electrolyte may be impregnated into the body for the anodization. For example, aluminum oxide may be formed on aluminum anode foil by the impregnation of a boric acid electrolyte and an anodizing voltage applied to the anode to produce a current flow which results in the formation of a dielectric film on the aluminum surface.

FIGURE 4 shows a coated capacitor body 16 contained in a can 17 in the partly broken away section to show the mandrel 10 and the convolutions of the foil 11, within the can 17. The open end of the can 17 is sealed with a suitable closure such as a resin end seal 18. The end of the mandrel is attached to a riser 19, which extends through the end seal 18. The material 20 represents the electrically conductive material in intimate contact with the dielectric film on the extended surfaces of the convoluted foil 11. As well as being interposed between the convolutions the electrically conductive material 20 forms a coat around the foil windings and a thin metallic coat 21 is applied to be positioned between the impregnated conductive material and the metal can 17 and provide good electrical interconnection. A negative lead 22 is attached to the bottom of the can 17.

Among other advantages of this invention is the greater capacitance per cubic inch, the lower equivalent series resistance and improved leakage characteristics for the fragile highly etched foil. The features of a pellet are obtained without the handling problems of a pellet. Moreover, the capacitor section is completely impregnated without excessive heat, particularly a solid electrolyte may be produced in a rolled foil structure without sintering or pyrolysis. Tabs and tab welds are eliminated. A key feature is the gentle handling which can be afforded the formed foil which in turn is reflected in a lower D.C. leakage.

The above-described embodiment has been set forth for purposes of illustration only and various modifications will be apparent to those skilled in the art within the main purpose of this invention. For example, the mandrel may be a foraminous ceramic tube or a tube having number of passages instead of a central bore and electrical connection to the anode foil may be suitably effected in some other manner. It is not necessary that the rolled anode be impregnated through the mandrel.

As numerous further variations and modifications will be readily apparent to those skilled in the art without departing from the spirit of this invention it is intended that the scope be limited only by the appended claims.

What is claimed is:

1. In an electrolytic capacitor the combination comprising a convolutely wound capacitor section having a fragile, porous, and liquid-permeable film-forming foil electrode, a mandrel centrally positioned in the convolutely wound section and supporting the electrode, said porous electrode having tortuous passageways through convolutions of said section, and an impregnated electrolyte in said section whereby a dielectric oxide may be formed in situ on the film-forming foil upon anodization thereof.

2. An electrolytic capacitor comprising a convolutely wound capacitor section having a fragile, porous, film-forming foil electrode and a mandrel centrally positioned in the convolutely wound foil and supporting the electrode, said porous electrode having tortuous passageways, a dielectric film formed on the surfaces of said electrode, an impregnated electrically conductive material in intimate contact with the dielectric film, said conductive material being suitably enclosed and electrical leads connected to the electrode and conductive material respectively.

3. An electrolytic capacitor as claimed in claim 2 having a porous mandrel and apertures in the porous mandrel at the convolutely wound foil.

4. An electrolytic capacitor as claimed in claim 2 having an impregnated electrically conductive material comprised of a wet electrolyte.

5. An electrolytic capacitor as claimed in claim 2 having an impregnated electrically conductive material comprised of a flowable mixture containing conductive particles.

6. An electrolytic capacitor as claimed in claim 2 having an impregnated electrically conductive material comprised of an organic charge-transfer type complex compound having a room temperature resistivity in the range of 0.01 ohm-cm. to about 220 ohm-cm.

7. In an electrolytic capacitor a convolutely wound capacitor anode having a convolutely wound, porous, fragile film-forming foil, a conductive hollow porous mandrel centrally positioned in the convolutely wound foil and electrically connected thereto, tortuous passageways through the convoluted foil, a dielectric film on said foil and a counterelectrode of impregnated electrically conductive material in said section in intimate contact with the dielectric film, said mandrel and said counterelectrode constituting terminal means for connection to said capacitor.

8. The method of producing a capacitor comprising the steps of etching a high purity aluminum foil to liquid permeability, tightly winding the etched foil around a mandrel, impregnating a formation electrolyte into said wound etched foil, anodizing said foil to form a dielectric film on its surface, removing the formation electrolyte, and impregnating a conductive electrode material into intimate contact with the dielectric film through said mandrel.

9. In the method of claim 8 the steps of impregnating said wound etched foil with the formation electrolyte through a porous mandrel and anodizing said foil in said electrolyte.

10. In the method of claim 8 the steps of impregnating the film-formed foil with an electrically conductive material in a vehicle and removing the vehicle.

References Cited

UNITED STATES PATENTS

| 2,755,237 | 7/1956 | Turner | 317—230 |
| 1,960,834 | 5/1934 | Tyzzer | 317—230 |
| 2,079,516 | 5/1937 | Lilienfeld | 317—230 |
| 2,755,418 | 7/1956 | Brennan | 317—230 |

JAMES D. KALLAM, *Primary Examiner.*

U.S. Cl. X. R.

29—570